United States Patent [19]

Zahn et al.

[11] Patent Number: 5,109,730
[45] Date of Patent: May 5, 1992

[54] CONTROL SYSTEM FOR SHIFTING A GEARBOX

[75] Inventors: Klaus Zahn, Oestringen; Werner Schmidt, Mannheim, both of Fed. Rep. of Germany

[73] Assignee: Deere & Company, Moline, Ill.

[21] Appl. No.: 466,540

[22] Filed: Jan. 17, 1990

[30] Foreign Application Priority Data

Jan. 19, 1989 [DE] Fed. Rep. of Germany ....... 3901421

[51] Int. Cl.⁵ .............................................. B60K 41/10
[52] U.S. Cl. ........................................ 74/866; 74/878; 74/877; 475/208; 475/256
[58] Field of Search ............. 74/878, 877, 866, 336 R; 475/208, 256

[56] References Cited

U.S. PATENT DOCUMENTS

| | | | |
|---|---|---|---|
| 2,785,582 | 3/1957 | Banker | 74/877 |
| 2,947,192 | 8/1960 | Prather | 74/336 R |
| 3,688,609 | 9/1972 | Friedline | 74/866 |
| 4,253,348 | 3/1981 | Will et al. | |
| 4,274,306 | 6/1981 | Yokoi et al. | 74/877 |
| 4,312,248 | 1/1982 | Sugimoto et al. | 475/208 |
| 4,551,802 | 11/1985 | Smyth | |
| 4,569,253 | 2/1986 | Higashi et al. | 74/866 |
| 4,625,590 | 12/1986 | Müller | 74/866 |
| 4,688,449 | 8/1987 | Harada et al. | 74/866 |
| 4,833,947 | 5/1989 | Izumi et al. | 74/878 |
| 4,897,790 | 1/1990 | Bieber | |

FOREIGN PATENT DOCUMENTS

| | | | |
|---|---|---|---|
| 0025823 | 4/1981 | European Pat. Off. | 475/208 |
| 0118184 | 9/1984 | European Pat. Off. | 74/866 |
| 2004004 | 9/1970 | Fed. Rep. of Germany . | |
| 3608208 | 9/1986 | Fed. Rep. of Germany . | |
| 3514946 | 10/1986 | Fed. Rep. of Germany . | |
| 3627718 | 1/1987 | Fed. Rep. of Germany . | |
| 0148619 | 11/1980 | Japan | 475/208 |
| 0078149 | 5/1985 | Japan | 74/866 |
| 0176839 | 7/1989 | Japan | 74/866 |

Primary Examiner—Leslie A. Braun
Assistant Examiner—Dan Wittels

[57] ABSTRACT

A power shift stage in the driveline of an internal combustion engine, is shifted depending on the load on the engine between at least two rotational speed ratios. A control system automatically controls shifting to improve driving comfort and increase productivity. The control system includes a switch connected to a fuel adjusting element or throttle, an engine rotational speed sensor and a control unit. The control unit automatically shifts the power shift stage in dependence upon the status of the switch and upon the sensed engine speed.

8 Claims, 3 Drawing Sheets

CONTROL SYSTEM FOR SHIFTING A GEARBOX

BACKGROUND OF THE INVENTION

The invention concerns a controller for shifting a gearbox the driveline of an internal combustion engine, in particular a power shift stage, whereby shifting between rotational speed ratios is accomplished in dependence upon engine load.

A power shift stage is widely used in agricultural tractors. The power shift stage is usually installed between a clutch and a conventional multi-speed gearbox. It is a planetary gearset that can be shifted hydraulically under load, which transmits the engine speed either unchanged or reduced by a certain amount, for example 20%. With the reduction in engine rotational speed the torque transmitted to the driving wheels is increased.

In a first shift position for normal vehicle speeds, hydraulic actuation of a multi-disk clutch connects the planet carrier rigidly with an inner sun gear. The planet carrier thus rotates with the sun gear. As a result the input and output shafts of the power shift stage rotate at the same speed.

In a second shift position the planet carrier is stopped relative to the gearbox housing by means of a hydraulically operated multi-disk brake. The power flow now runs through the sun gear which is connected to the input shaft, to the planet where a speed reduction occurs, to the second sun gear which is connected to the output shaft of the power shift stage. Hence the output shaft speed of the power shift stage is reduced from the input shaft speed. Simultaneously the output torque is increased.

The second shift position of the power shift stage is applied when an increased torque is demanded by the drive. The shift between the two shift positions is possible without interruption of the power flow between the engine and the drive wheels.

The shifting of the power shift stage is usually performed by manual operation of a shift lever In the operator's cab, by means of which a hydraulic valve can be controlled. The hydraulic valve selectively directs pressurized oil to the multi-disk clutch and to the multi-disk brake of the power shift stage.

A shift from the first to the second shift position should then be performed when the load on the drive increases (for example, due to an increase in slope of the terrain traversed or a change in the soil condition) to such a degree that the rotational speed of the engine is reduced and drops below the region of maximum power output. The shift accomplishes an increase in the rotational speed of the engine with constant vehicle speed. By this means the productivity of the drive is improved and the torque reserve increased considerably.

Upon reduction of the load on the drive a shift from the second into the first shift position should occur when the rated speed of the engine is exceeded and a sharp drop in the power output results as the power curve falls off. Otherwise the output of the engine falls off sharply and the specific fuel consumption increases by leaps and bounds.

The shift points are established by the operator on the basis of experience. However the shift from the second into the first shift position usually occurs at too high an engine speed. This may result in stable driving conditions, but the engine no longer operates at maximum possible power. Furthermore, the fuel consumption increases.

SUMMARY OF THE INVENTION

An object of the present invention is to provide an improved system for shifting a power shift stage type of gearbox.

This and other objects are achieved by the present invention which comprises a shift control system which includes a switch connected to a fuel flow adjusting element (such as a foot pedal), an engine rotational speed sensor and a control unit. The signals from the switch and the engine speed sensor are transmitted to the control unit which transmits control signals for automatic shifting to the power shift gearbox upon exceeding or underrunning a pre-set value of fuel flow as well as at least one pre-set value of engine speed.

Ideally, the power shift gearbox should be shifted automatically depending on engine power output. However, engine power output is not directly available as a value that can be measured, since it is a value derived from torque and rotational speed. It would be possible to perform the shifting at certain torque values to be established. The torque values could be determined directly by a torque sensing hub, or indirectly by the fuel consumption or the exhaust gas temperature. However, the determination of the torque is relatively costly. The appropriate measurements would have to be obtained solely for the actuating device for the shift, since they are usually not available in vehicles.

Therefore the invention proposes to use the engine rotational speed to establish the shift points. In many vehicles the engine rotational speed is available as a measured signal, in order to provide a speed indication in the vehicle cab. However, the engine speed alone does not provide an indication cf the load of the engine. This indication is possible if, at the same time, data are available on the fuel flow. For a given fuel flow there is a unique connection between engine speed, engine torque and engine power output. Hence, if a certain fuel flow is used as basis, shift points can be established for the gearbox by providing certain engine speed values.

This shift control system is particularly useful at high engine loads. High engine loads are required especially in primary soil working operations (plowing) by an agricultural tractor. Here, in particular, the shift control system assures an improved driving comfort during frequent load changes that can be caused by varying soil compaction and/or hilly ground, when the load on the tractor varies over a region that can be covered by the engine torque reserve together with the automatic shift actuation.

This shift control system increases productivity, since without manual intervention the torque reserve can be increased. By appropriate setting of the shift points (pre-set engine speed values) the fuel consumption can also be reduced.

A further advantage of this shift control system is that, in contrast with manual control during rough operating conditions, automatic shifting can be more precisely set with regard to maximum possible engine performance. In addition, the shift timing required to reach the end position during the shift can be more precisely defined. This has a positive effect on the reliability of the shift control system.

Automatic torque control on the basis of pre-set engine speed values is not limited to the actuation of one gearbox. For example, an implement coupled to a tractor could be controlled (plow height adjustment).

Preferably, a stop switch is mounted in the area of the throttle linkage and can be operated thereby. In the case of a diesel engine, throttle linkage would apply to the speed adjustment lever of the fuel injection pump. In the case of a gasoline engine, it would apply to the throttle control of the carburetor or the corresponding operating lever. The stop switch could be a simple micro switch, which is operated when a pre-set value of fuel flow is exceeded.

The pre-set value of fuel flow preferably corresponds to the full throttle position of the adjusting element. In the full throttle position for each value of engine speed, the corresponding maximum torque or the corresponding maximum engine power is produced (see characteristic curves in FIG. 2.). Hence, in the full throttle position the maximum engine power is utilized. If the shift arrangement is actuated at part load, shifting of the gearbox is normally not necessary since the increased power demand can be met by operation of the gas pedal.

According to a preferred embodiment, an upper engine speed value, which is close to the rated speed of the engine, is pre-set as an upper shift point at which a downshift in engine speed is to occur (shifting from the second to the first shift position). Therewith the power output of the engine is fully utilized, while avoiding engine operation in the area of the power curve that is falling off rapidly.

Preferably the upper engine speed value is somewhat above rated engine speed, yet not so high that an excessive increase in fuel consumption occurs. For example, the upper engine speed value may vary by 30 rpm per minute above or below rated engine speed.

While the upper speed value must be set relatively close to rated engine speed, the lower speed value can be set within a relatively wide area, without any deleterious effect upon the automatic shifting, since here there is no strong dependence of fuel consumption on engine speed. But it is advantageous to select a lower shift point, at which an upshift of engine speed is to occur (shift from first to second shift position) by establishing a lower speed value which is selected so that at this speed the engine power output is close to its maximum output (upper power level). Agricultural tractors, in particular, frequently exhibit an upper power level at high engine speeds, whose lower engine speed limit may be used to establish the lower shift point. In the engine speed range of the upper power level the characteristic torque curve exhibits a negative slope with a corresponding torque reserve.

Preferably the lower shift point is established in such a way that the corresponding torque is somewhat greater than the torque value associated with the upper shift point. In shifting from the first into the second shift position and the inverse there results a hysteresis loop, which will avoid excessively frequent (rapid) shifting when the engine torque is close to the values at the shift points.

It is appropriate that the actuating device for the shifting include a manually operated switch with at least three switch positions. In one switch position automatic operation is selected, while the other positions permit manual control of the gearbox shifting. If desired, this will permit deactivating the automatic control and shifting the gearbox in the conventional manner.

DETAILED DESCRIPTION

Figure 1:
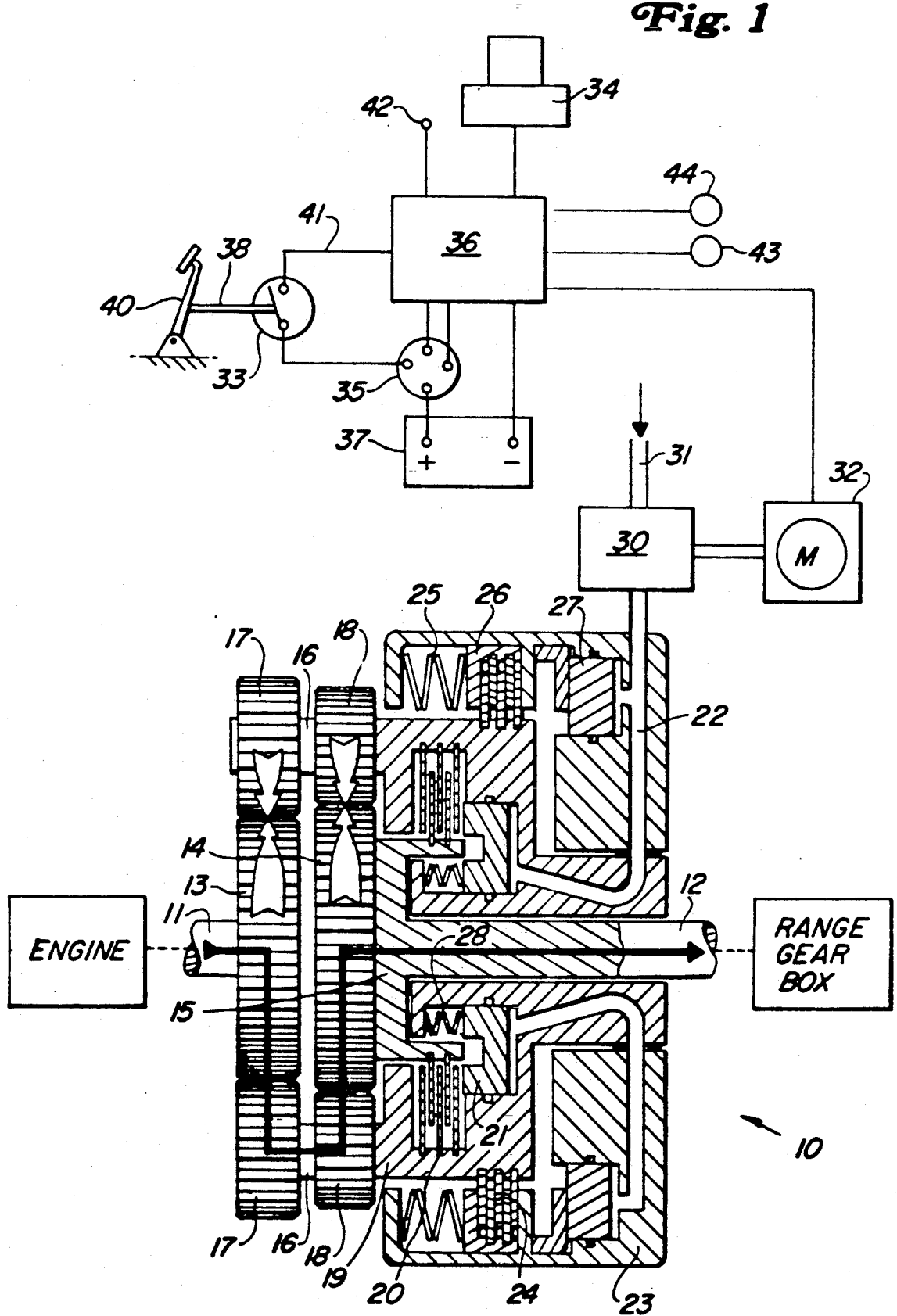
FIG. 1 shows a cross section of a power shift Gearbox as well as an actuating device according to the invention.

The power shift gearbox 10 is inserted in the driveline of a tractor, not shown, connected by a drive shaft 11 to the internal combustion engine and a gearbox input shaft 12 connected to a multi-speed gearbox. The drive shaft 11 drives a first sun gear 13. The gearbox input shaft 12 is connected by positive locking to a second sun gear 14 and a clutch hub 15. At the circumference of the sun gears 13, 14 several planets 16 are arranged of which two are shown. Each of the planets 16 carries two gears 17, 18 with differing diameters.

The planets 16 are supported by a planet carrier 19. Between the planet carrier 19 and the clutch hub 15 there is a multi-disk clutch 20, which can be operated hydraulically by a piston 21. If the piston 21 is supplied with pressurized oil through an oil channel 22, it will compress the disks of the multi-disk clutch 20 and connect the planet carrier 19 to the clutch hub 15 with a positive lock. When the oil pressure is reduced the piston 21 is forced back by the pre-load of Belleville springs 28, so that the multi-disk clutch 20 disengages.

Between the outer circumference of the planet carrier 19 and a brake housing 23, which is connected rigidly to the gearbox housing, a multi-disk brake 24 is arranged. In its unloaded condition the multi-disk brake 24 connects the planet carrier 19 with the brake housing 23. Here the disks are pressed together by a yoke 26 which is which is loaded by Belleville springs 25. The yoke 26 is connected to a piston 27 that can be operated hydraulically. If the piston 27 is loaded by pressurized oil, it moves the yoke 26 against the force of the Belleville springs 25 and releases the positive lock of the disks of the multi-disk brake 24.

The oil channel 22 is connected through a control valve 30 and a pressure oil supply 31 with a pressure oil reservoir, not shown. Opening the control valve 90 admits pressurized oil to the oil channel 22. Thereupon the two pistons 21 and 27 are moved from their positions of rest. The piston 21 brings the multi-disk clutch 20 into engagement, while the piston 27 releases the multi-disk brake 24. Now a positive connection exists between the clutch hub 15 and the planet carrier 19, which can rotate freely with respect to the brake housing 23. Since the gearbox input shaft 12 is positively looked to the planet carrier 19 by means of the multi-disk clutch 20, the gearbox input shaft 12 rotates at the same speed as the drive shaft 11 and the gear ratio is 1:1.

If the control valve 30 is closed, the pressure in the oil channel 22 is released. The pistons 21 and 27 are moved to their positions of rest by the force of the Belleville springs 25, 28. Therewith the multi-disk clutch 20 is released, while the multi-disk brake 24 is actuated, so that the planet carrier 19 is locked to the brake housing 23 and can no longer rotate. Power flow now runs from the drive shaft 11, the first sun gear 13, the planets 16 and the second sun gear 14 with the clutch hub 15 through the gearbox input shaft 12 to the multi-speed gearbox. This power flow was indicated in FIG. 1 by a heavy black line. The diameter ratios of the gears 13, 14, 17, 18 determines the gear ratio. This is less than 1, so that the drive shaft 11 runs faster than the gearbox input shaft 12. By means of the power shift gearbox 10 the rotational speed of the drive is reduced by about 20%.

The control valve 30 is operated by a servo motor 32, the control signals for which are generated by the control unit 36. A switch arrangement 33, a rotational speed sensor 34, and a selector switch 35 are connected to the control unit 36. Its electrical supply is furnished by a battery 37.

The switch arrangement 33 is configured as a micro switch whose actuator 38 is connected to an adjusting element 40 for the fuel supply. The adjusting element may be the throttle lever, which operates the throttle of a carburetor or a fuel injection pump. According to figure 1 the micro switch 33 is connected to the gas pedal. The contacts of the switch arrangement 33 close when the adjusting element 40 is in the position of maximum fuel flow (maximum fuel flow with gas pedal fully depressed). In this case the electronic control unit 36 is activated if the selector switch 35 is set for automatic control.

The selector switch 35 has three switch positions. In two of these positions the power shift gearbox is shifted either into the first or the second shift position by means of the control unit 36. In a third switch position, which is the condition covered in FIG. 1, the selector switch 35 is set for automatic operation which occurs according to the invention. In the automatic position the selector switch 35 connects one pole of the battery 37 with the switch 33, whose other contact is connected to the automatic input 41 of the control unit 36.

If an electric connection is established between the pole of the battery and the automatic input 41, the electronic unit 36 determines the current value of engine rotational speed n. In the other case the electronic unit effects a shift of the power shift gearbox 10 to its first shift position, in which no rotational speed reduction is performed.

If the control unit 36 is activated (full throttle position), the decisive parameter for the torque is the engine speed, n. This can be obtained simply as an electrical signal and is already available in many tractors for the production-type central control panel.

An electrical speed indicator may be used as rotational speed sensor 34 which detects the rotational speed of the engine. The electrical engine speed signal is transmitted to the electronic control unit 36 and compared to speed values (see FIG. 3) which have been pre-set by an input 42 in the control unit 36 as shift points. This applies to a lower and an upper speed value, ($n_u$, $n_o$). The engine speed sensor 34 is preferably a rotational speed sensor mounted on the engine. In principle engine speed could be sensed by measuring the rotational speed at any other point along the driveline, here, however, the speed ratio through any intervening gearboxes would have to be considered. The speed sensor 34 may be a magnetic sensor which generates an electrical signal that is proportional to the rotational speed of the engine.

Figure 3:
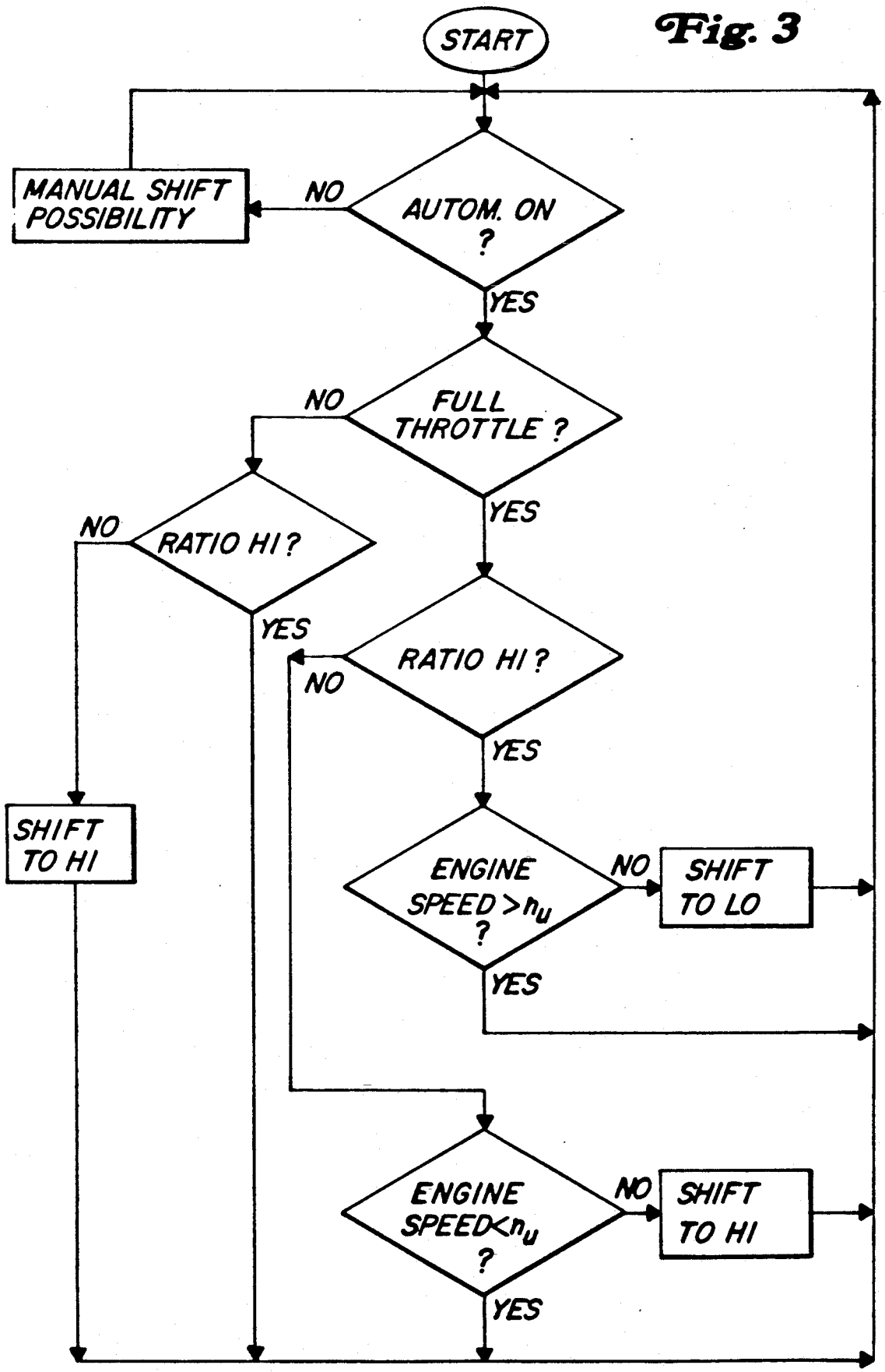
FIG. 3 shows a simplified flow chart of an algorithm performed by the control unit of the present invention.

The control unit 36 analyzes the signals according to an algorithm such as illustrated by the flow chart shown in FIG. 3. The control unit 36 generates electrical control signals for the shifting of the power shift gearbox (10). The control electrical signals drive a simple servo motor 32, which is located close to the control valve 30 of the power shift gearbox 10. Alternatively, the control signal of the control unit 36 could be applied to an electro-magnet which directly actuates the control valve of the power shift gearbox 10. Furthermore a power shift gearbox could be provided, whose clutch and brake are actuated by electro-magnets, whose actuating signals are made available by the control unit.

If the engine speed value decreases below the lower speed value $n_u$, the electronic control unit 36 transmits a signal to the servo motor 32 so that the control valve 30 is closed, and that the power shift gearbox 10 performs a speed reduction of the input speed. If, on the other hand, the engine speed increases above an upper speed value $n_o$, then the control unit 36 transmits a signal to the servo motor 32 to open the control valve 30 and to fill the oil channel 22 with pressurized oil. Thereby the power shift gearbox 10 is shifted so that the drive shaft 11 and the gearbox input shaft 12 rotate at the same speed.

An indicator 43 located in the operator's cab indicates which signal is being transmitted to the servo motor 32. As we have seen, this signal represents the shift condition of the power shift gearbox 10. A further indicator 44 in the vehicle cab displays the engine speed detected by the speed sensor 34.

Figure 2:
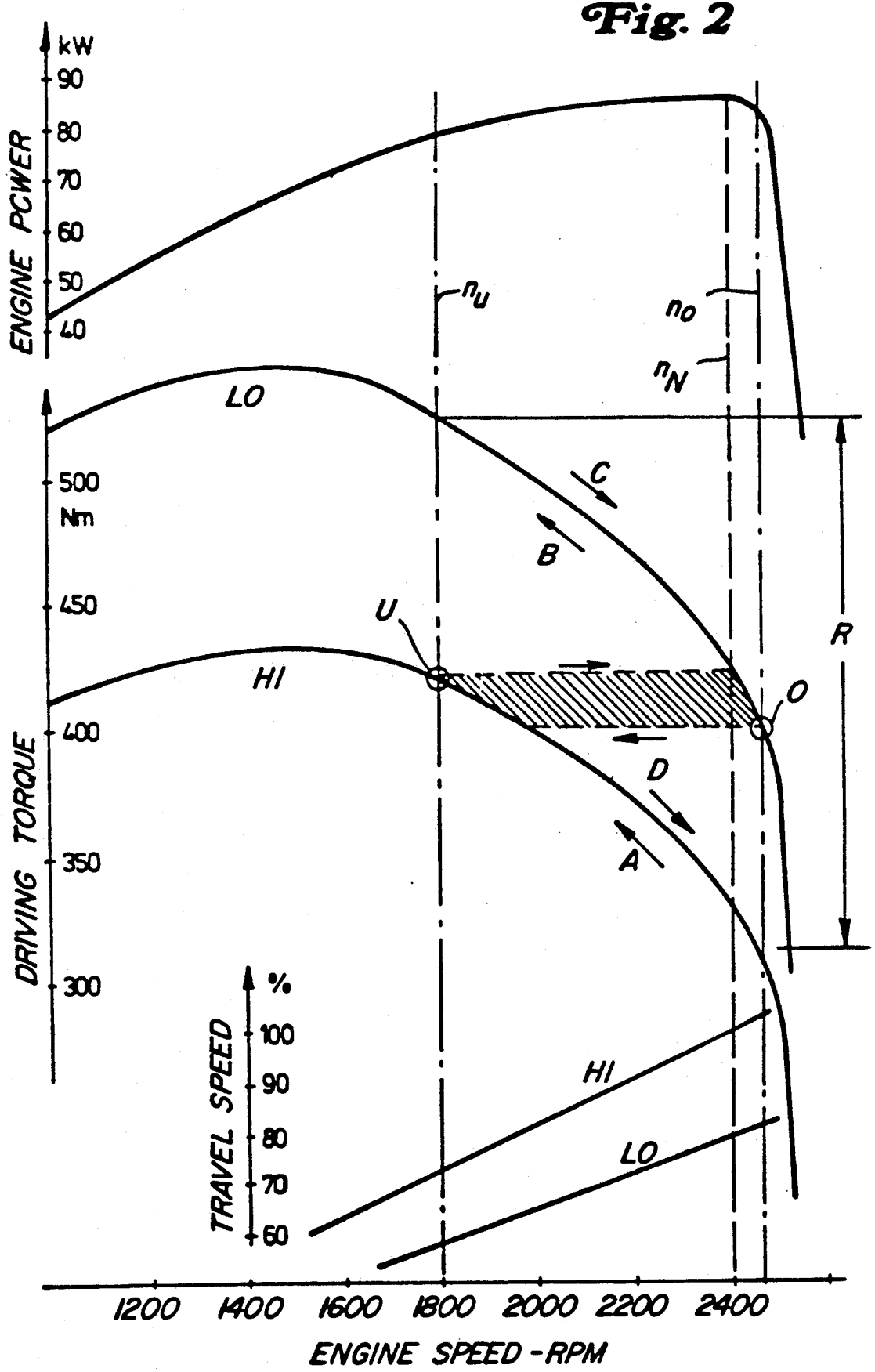
FIG. 2 shows engine characteristics.

To clarify the shift process, FIG. 2 shows characteristic curves of several variables in terms of the engine speed, n. Here $n_u$ indicates a lower speed value (lower shift point), $n_o$ indicates an upper speed value (upper shift point), while $n_N$ shows the rated engine speed.

The upper characteristic curve represents engine power at full throttle. The curve shows an upper power level, that runs approximately horizontally between the lower and the upper value of rotational speed ($n_u$, $n_o$). For effective utilization of engine output, shifting of the power shift gearbox 10 is performed in such a way that the engine is operated, if possible, in the region of this upper power level.

Below the characteristic curve of engine output two characteristics are shown, on a different scale, of the torque at full throttle produced by the power shift gearbox 10. The upper curve (LO) shows the torque produced with a speed reduction from the engine speed. The lower curve (HI) shows the torque at a 1:1 speed ratio of the gearbox.

Below the characteristic curves of the torque the two corresponding linear characteristics of vehicle speed are shown.

If the tractor is operated at full throttle, the torque output will follow one of the two torque characteristic curves (HI, LO), depending on the load on the tractor and the shift condition of the power shift gearbox 10. At relatively low load on the tractor the operating point is found on the lower torque characteristic (HI), particularly in the area of high engine speeds. With increasing load the operating point moves along the lower torque characteristic curve (HI) in the direction of the arrow A. If the lower rotational speed value $n_u$ is reached, a shift of the power shift gearbox 10 occurs at the point 0 which makes it possible to increase engine speed while maintaining the same vehicle speed. Due to the shift the operating point jumps from the lower torque characteristic curve (HI) to the upper torque characteristic curve (LO). With further increasing load the operating point moves along the upper torque characteristic curve (LO) in the direction of the arrow B.

The torque reserve made possible by the shifting of the power shift gearbox 10 is indicated with R. This reserve can be fully utilized without requiring any manual intervention by an operator.

With falling load the operating point moves along the upper torque characteristic (LO) in the direction of the arrow C up to the upper rotational speed value $n_o$. Upon reaching the shift point 0, the power shift gearbox 10 is shifted in such a way that a reduction in engine speed occurs while vehicle speed remains constant. Thereupon the operating point jumps from the upper torque characteristic (LO) to the lower torque characteristic (HI). With further reduction in the load the operating point moves along the lower torque characteristic (HI) in the direction of the arrow D.

The lower rotational speed value $n_u$ may be established over relatively wide limits, without having a notable effect upon the load capacity of the drive. In the above example the lower rotational speed value could easily have been moved up or down by 100 rpm.

On the other hand, the load capacity of the drive react with relatively high sensitivity to a change in the upper rotational speed value $n_o$. With a very minor increase in the upper rotational speed value one gets into the rapidly declining region of the engine load curve. This results in a considerable increase in the fuel consumption. With a reduction in the upper rotational speed value $n_o$ the available engine load capacity is not fully utilized. In the above example the upper rotational speed value $n_o$ should not deviate more than 20 rpm from the value indicated.

If the machine is operated in a region of torque that is close to both shift points in and 0, frequent shifting between the upper and the lower torque characteristics can be avoided if the torque value of the lower shift point is clearly above the torque value of the upper shift point 0. Since the upper shift point, as described in the preceding section, can be varied only slightly, the lower rotational speed value $n_u$ is selected in such a way that the shift point U is associated with a higher torque value than the shift point 0.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A control system controlling a power shift stage connected between an internal combustion engine and a range gear box, the power shift stage comprising downshift means for reducing the transmission ratio and upshift means for increasing the transmission ratio, the engine having a fuel adjusting element for controlling a rate of fuel feed thereto, the control system having means for controlling the transmission ratio of the power shift stage depending upon engine load, a switch connected to the fuel adjusting element, an engine speed sensor for sensing the speed of the engine, and a control unit coupled to the switch, to the engine speed sensor and to the power shift stage, the control unit automatically shifting the power shift stage if the status of the switch and the sensor indicate that the fuel feed rate and the sensed engine speed fall outside of a certain range, the control unit comprising:

means for downshifting the power shift stage to reduce the transmission ratio when the switch indicates that the fuel adjusting element attains a full throttle position and the engine speed sensor indicates that the engine speed falls below a predetermined value corresponding to an upper power level and a second means for upshifting the power shift stage to increase the transmission ratio if the engine speed sensor indicates that the sensed engine speed exceeds a predetermined upper rated engine speed.

2. The control system of claim 1, wherein:

the fuel adjusting element comprises a throttle level; and the switch is operatively connected to the throttle lever.

3. The control system of claim 2, characterized by:

the switch is actuated when the throttle lever moves to a position corresponding to a full throttle position.

4. The control system of claim 1, wherein:

the control unit down shifts the power shift stage at a down shift engine speed which is near a rated speed of the engine.

5. The control system of claim 4, wherein:

the down shift engine speed deviates by a maximum of 30 revolutions per minute from the rated engine speed.

6. The control system of claim 1, wherein:

the control unit up shifts the power shift stage at an up shift engine speed which is near a speed at which the engine attains maximum power and which is lower than the down shift engine speed.

7. The control system of claim 6, wherein:

the down shift speed is associated with an engine torque value which is greater than an engine torque value associated with the up shift speed.

8. The control system of claim 1, further comprising:

a manually operated switch coupled to the control unit, the manually operated switch having at least three positions, where in one position automatic operation of the control unit is enabled, while in the other positions the control unit shifts the power shift stage to certain gear ratios.

* * * * *

UNITED STATES PATENT AND TRADEMARK OFFICE
CERTIFICATE OF CORRECTION

PATENT NO. : 5,109,730

DATED : 5 May 1992

INVENTOR(S) : Klaus Zahn et al.

It is certified that error appears in the above-identified patent and that said Letters Patent is hereby corrected as shown below:

In Col. 8, line 9, delete "comprising:" and insert -- including a first --.

In Col. 8, line 22, delete "level" and insert -- lever --.

Signed and Sealed this

Sixth Day of July, 1993

Attest:

MICHAEL K. KIRK

*Attesting Officer*   *Acting Commissioner of Patents and Trademarks*